Sept. 29, 1959    E. A. REUSSENZEHN ET AL    2,906,233
COMPUTING SCALE
Filed Jan. 22, 1957
FIG-1
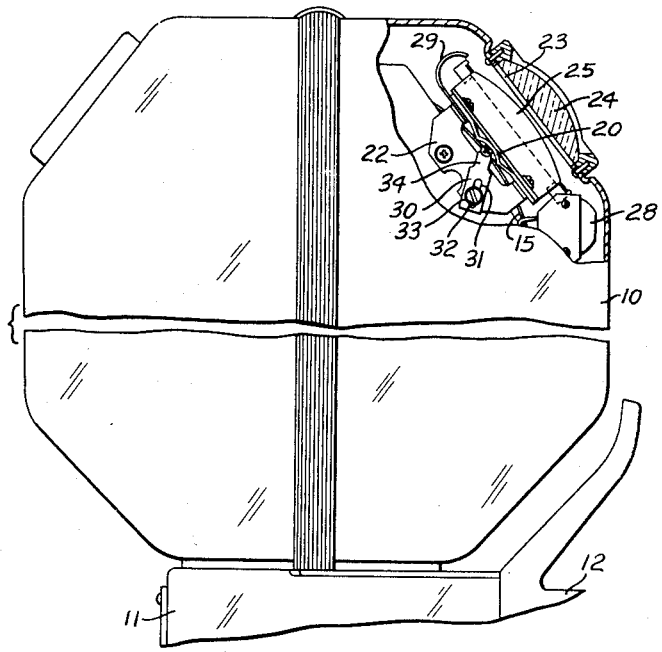
FIG-2
FIG-4
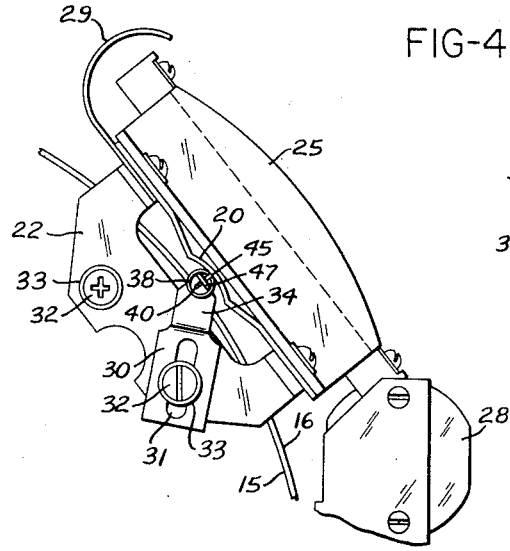
FIG-3
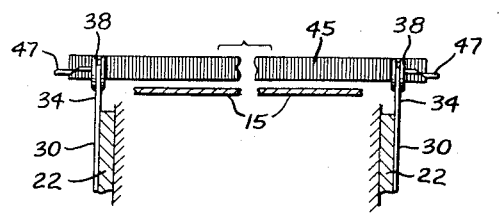
INVENTOR.
ERNEST A. REUSSENZEHN
HAROLD GOLDBERG
BY
Marchal, Biebel, French & Bugg
ATTORNEYS

United States Patent Office 2,906,233
Patented Sept. 29, 1959

2,906,233

COMPUTING SCALE

Ernest A. Reussenzehn and Harold Goldberg, Dayton, Ohio, assignors to The Hobart Manufacturing Company, Troy, Ohio, a corporation of Ohio Application January 22, 1957, Serial No. 635,227

4 Claims. (Cl. 116—129)

This invention relates to computing scales, and more particularly to an indexing mechanism for a computing scale.

The invention has special relation to a scale which incorporates a drum type chart and an indexing or reading member in the form of a tape of substantially greater width than thickness arranged with the width thereof defining the correct reading plane for the indicia of weight and value on the chart, as disclosed in the copending application of Kenneth C. Allen and Ernest A. Reussenzehn, Serial No. 568,371, filed February 28, 1956, and assigned to the same assignee as this application. Such an indexing or reading tape offers definite advantage of accuracy as well as convenience in assuring the chart is read from the correct eye position, and this result is further aided by the provision of differently colored surfaces on the tape as was disclosed in the above application.

It is a primary object of the present invention to provide a mounting mechanism for a reading tape of the above type in a scale which facilitates adjustment of the tape into properly accurate relation to the scale chart for the particular conditions of use of the scale, including the location of the scale and the eye position most convenient for the operator when reading the scale.

Thus a scale of the above general type is sometimes installed on a counter, where it is well below normal eye level, or it may be mounted on top of a show case or similar comparatively high location where it is near or only slightly below normal eye level. If the scale incorporates a reading tape as described above, the reading plane established by the width of the tape may be too steep if the scale is on the body case and not steep enough if it is on the counter, and further if such reading plane is correctly inclined for one of these locations, it would be definitely wrong for the other one.

It is therefore another object of this invention to provide a scale having an improved adjustable mounting for a reading tape of the above general type wherein the tape may be rotated about an axis generally parallel to the surface of the chart to establish a desired setting of the reading plane defined by the width of the tape in accordance with the desired location of the scale and the normal eye position of the operator or user thereof.

A further object of the invention is to provide in such mounting for independent adjustment of opposite ends of the tape to assure that the entire surface of the tape is uniformly related to the chart of the scale.

Other objects and advantages of the invention will be apparent from the following description, the accompanying drawings and the appended claims.

In the drawings—

Fig. 1 is a side view, with parts broken away and shown in section, of a scale incorporating the features of this invention;

Fig. 2 is an enlarged detail view of the parts shown in the break-out at the upper right hand corner of Fig. 1, showing the improved mounting for the reading tape;

Fig. 3 is a somewhat schematic view of the reading tape and a portion of the chart, illustrating the mounting of the tape in accordance with the invention; and Fig. 4 is an exploded perspective view on an enlarged scale of the spring holder clip and slotted button which form a part of the improved mounting mechanism.

Referring to the drawing, which illustrates a preferred embodiment of the invention, and particularly to Fig. 1, a scale incorporating the features of the invention is shown as including a chart housing 10 mounted upon a base 11 and carrying a weight receiving platter 12. Suitable mechanism, such for example as shown in the patent to David A. Meeker et al., 2,723,113, issued November 8, 1955, links platter 12 with a drum chart 15 to provide for rotation of the drum about its longitudinal axis in proportion to weight applied to the platter.

The chart 15 carries upon its surface suitable indicia including weight designations and price designations arranged generally in parallel columns and adapted to cooperate with unit price designations carried upon a stationary price face 20 (Fig. 2) for computing the price of the weighed articles corresponding to the weight and price per pound. Bracket members 22 are mounted within housing 10 at opposite sides of drum 15 to support price face 20 across and spaced from the indicia bearing surface of chart 15.

The housing 10 includes an opening 23 above the location of price face 20 in which a cylindrical lens 24 may be mounted to magnify the indicia on the price face and the chart for reading purposes, and an auxiliary or booster lens assembly is shown at 25 for further magnifying the higher and therefore smaller sized and more closely spaced graduations on the chart as disclosed in Allen et al. Patent 2,742,811, issued April 24, 1956, to the assignee of this application. A suitable light such as a fluorescent tube 28 is carried below opening 23, and a light shield 29 is supported at the upper or opposite edge of the opening to reflect light onto price face 20.

Each of the bracket members 22 carries an indicator holder clip 30, preferably formed of spring metal and having an elongated slot 31 in one end thereof for receiving one of the mounting screws 32 of bracket 22. A suitable washer 33 presses against holder clip 30 as the mounting screw is tightened. The other end 34 of each holder clip 30 extends at an angle from the main portion of the clip, as best seen in Figs. 3 and 4, and is bifurcated as shown in Fig. 4 with the inner surface 35 between the arms 36 defining a circle segment the periphery of which is slightly greater in extent than 180° but substantially less than 270°.

The bifurcated arm receives a button 38 provided with a transverse slot 40 and a circular peripheral slot 42, the latter slot having a diameter slightly less than the diameter of the circular segment defined by arms 36. The buttons 38 thus are received in rotatable relation between the arms 36 of the holder clips. Since the arms will extend about more than one-half the extent of the bottom of slot 42 when the button 38 is snapped into place between them, the button is retained in rotatable relation within the bifurcated end of the holder clip.

Referring to Fig. 3, the reading tape 45, which is substantially greater in width than in thickness, and which preferably has the wide sides thereof colored to contrast with its narrow edges or sides, is shown in position with respect to chart 15. At opposite ends of tape 45 are suitable abutment means 47, shown as slit rings which extend through suitable perforations in the tape. The spacing between the abutments 47 is preferably somewhat less than the spacing between the buttons 38, and the width of slots 40 is such that the thickness of tape 45 is received within the buttons, but the abutment means 47 will engage the dished side surfaces 48 of the buttons.

Thus to fix the tape in position, it is only necessary to spring the holder clips 30 slightly inward, and this results in the tape being held in position under tension, with the free end 34 of clip 30 being flexed inward so that button 38 will be approximately in line or parallel with mounting end of clip 30, as shown in Fig. 3 and being rotatable about an axis generally parallel to the chart surface 16.

This mounting for tape 45 offers substantial practical advantages in both the initial assembly and the use of the scale. The clips 30 can be secured in place by tightening screws 32, and the final or fine adjustment of the reading plane defined by the width of tape 45 may be made by grasping the ends of the tape and rotating the buttons 38 by twisting the ends of the tape until the reading plane is properly related to the particular location in which the scale is to be used. The proper tare adjustment may then be effected to align the zero line with the tape, by means of the conventional tare adjusting mechanism, not shown. Furthermore, if any changes in the location of the reading plane should subsequently be desired they may readily be made merely by adjusting the position of buttons 38, accompanied by appropriate tare adjustment.

Another important feature of this mounting is the provision of separate adjustments for each end of the tape. Reading tapes of this type generally are manufactured from long thin strips of spring steel, and this material may have a tendency to curl or bend about its longitudinal axis. Such a curl in the tape can be eliminated, and the entire width of the tape located in one plane, by twisting the ends of the tape independently and thus adjusting the buttons 38 independently of each other. Since the tape thereafter is supported under maintained tension, the parts remain as set unless subjected to severe shock or to actual physical contact with some disturbing element.

While the form of apparatus herein described, constitutes a preferred embodiment of the invention, it is to be understood that the invention is not limited to this precise form of apparatus, and that changes may be made therein without departing from the scope of the invention which is defined in the appended claims.

What is claimed is:

1. In a weighing scale the combination of a chart having graduated indicia on one surface thereof, a reading tape of substantially greater width than thickness, mechanism supporting said chart and said tape for relative movement in proportion to weight applied to the scale, holder clips mounted at opposite sides of said chart for supporting said tape across the surface of said chart spaced slightly therefrom, each said clip having one end fixed to said supporting mechanism and having a free bifurcated portion at its other end, the inner surface of said bifurcated ends defining circle segments having a periphery of more than 180° and substantially less than 270°, a transversely slotted button having a circular peripheral slot received in said bifurcated end of each said clip, and means retaining the opposite ends of said tape in the transverse slots of said buttons supporting said tape for rotation about an axis generally parallel to said chart surface to provide for straightening of said tape and for adjustment of the reading plane defined by the width of said tape.

2. In a weighing scale the combination of a chart having graduated indicia on one surface thereof, an index tape of substantially greater width than thickness, retaining abutment means on opposite ends of said tape, mechanism supporting said chart and said tape for relative movement in proportion to weight applied to the scale, holder clips mounted at opposite sides of said chart for supporting said tape across the surface of said chart spaced slightly therefrom, each said clip having one end fixed to said supporting mechanism and having another bifurcated end extending above the surface of said chart, the inner surface of said bifurcated ends defining a circle segment having a periphery of more than 180° and substantially less than 270°, a button having a circular peripheral slot received in rotatable relation in the bifurcated end of each said clip, each said button having a transverse slot of sufficient width to receive the thickness of said tape and of less width than said abutment means, and the distance between said buttons being slightly greater than the distance between said abutment means on said tape providing for tensioning of said tape in its longitudinal direction by the spring action of the bifurcated ends of said clips.

3. In a weighing scale, an adjustable mounting for a reading tape of substantially greater width than thickness to provide fine adjustment of the reading plane defined by the width of said tape, comprising a spring holder clip having an opening in one end thereof for receiving means to support said clip in fixed relation to said scale, a transversely slotted button having a circular slot around its periphery, the other end of said clip being bifurcated, the inner surface of said bifurcated end defining a circle segment of slightly greater diameter than said circular slot in said button and receiving said button in rotative relation therein, the circle segment defined by said bifurcated end being greater than 180° and substantially less than 270° providing for engagement of more than one-half the surface of said circular slot by said clip to retain said button on said clip in adjustable relation thereto, and the transverse slot in said button being adapted to receive and support one end of the reading tape.

4. In a weighing scale the combination of a chart having graduated indicia on a surface thereof, a reading tape of substantially greater width than thickness, mechanism supporting said chart and said tape for relative movement in proportion to weight applied to the scale, holder clips mounted at opposite sides of said chart for supporting said tape across the surface of said chart spaced slightly therefrom, each said clip having one of its ends fixed to said supporting mechanism and having its other end extending outwardly of said surface of said chart, abutment means on said tape spaced apart a distance slightly less than the distance across said chart between said other ends of said clips, and means rotatably mounted in each of said other ends of said clips and engaging said abutment means to hold said tape in tension in predetermined alignment with said chart surface and to provide for rotation of said tape along its length about an axis parallel to and spaced from said chart surface.

References Cited in the file of this patent

UNITED STATES PATENTS

| | | |
|---|---|---|
| 1,669,428 | Strachan | May 15, 1928 |
| 1,689,725 | Hurt | Oct. 30, 1928 |
| 1,706,519 | Booth | Mar. 26, 1929 |
| 1,729,106 | Hallwood | Sept. 24, 1929 |
| 2,742,811 | Allen et al. | Apr. 24, 1956 |